(12) United States Patent
Zuo

(10) Patent No.: US 11,551,721 B2
(45) Date of Patent: Jan. 10, 2023

(54) VIDEO RECORDING METHOD AND DEVICE

(71) Applicant: BEIJING DAJIA INTERNET INFORMATION TECHNOLOGY CO., LTD., Beijing (CN)

(72) Inventor: Shicheng Zuo, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/650,759

(22) PCT Filed: Sep. 25, 2018

(86) PCT No.: PCT/CN2018/107299
§ 371 (c)(1),
(2) Date: Mar. 25, 2020

(87) PCT Pub. No.: WO2019/057198
PCT Pub. Date: Mar. 28, 2019

(65) Prior Publication Data
US 2021/0201952 A1     Jul. 1, 2021

(30) Foreign Application Priority Data
Sep. 25, 2017  (CN) .......................... 201710876316.0

(51) Int. Cl.
*G11B 27/00* (2006.01)
*G11B 27/06* (2006.01)
(Continued)

(52) U.S. Cl.
CPC .......... *G11B 27/036* (2013.01); *G11B 27/034* (2013.01); *G11B 27/06* (2013.01); *G11B 27/34* (2013.01); *H04N 5/2621* (2013.01)

(58) Field of Classification Search
USPC ................ 386/278, 282, 280, 286, 239, 241
See application file for complete search history.

(56) References Cited

U.S. PATENT DOCUMENTS

| 8,208,067 B1 | 6/2012 | Singh et al. |
| 9,858,969 B2 * | 1/2018 | Khan ..................... G11B 27/34 |
| (Continued) | | |

FOREIGN PATENT DOCUMENTS

| CN | 101909151 A | 12/2010 |
| CN | 101931773 A | 12/2010 |
| (Continued) | | |

OTHER PUBLICATIONS

International Search Report and Written Opinion issued by the International Searching Authority (ISA/US) in PCT Application No. PCT/CN2018/107299 dated Jan. 3, 2019. 15 pages.

*Primary Examiner* — Daquan Zhao
(74) *Attorney, Agent, or Firm* — Meunier Carlin & Curfman LLC

(57) ABSTRACT

Embodiments of the present application provide a video recording method and device. The method includes: receiving, by an application of a mobile terminal, a video recording instruction of a user; generating, according to a photographing scene, a video stream that can be edited according to segments, the video stream including at least one frame sequence segment; and uploading the edited video stream to a server. According to the present application, by generating a video stream consisting of at least one frame sequence segment during video recording, where the generated video stream can be edited according to segments, the error tolerance of video capture is improved, and the costs of later video editing are reduced.

19 Claims, 3 Drawing Sheets

(51) Int. Cl.
   *G11B 27/34*    (2006.01)
   *G11B 27/036*   (2006.01)
   *G11B 27/034*   (2006.01)
   *H04N 5/262*    (2006.01)
   *H04N 5/93*     (2006.01)
   *H04N 5/76*     (2006.01)

(56) References Cited

U.S. PATENT DOCUMENTS

| | | | |
|---|---|---|---|
| 10,686,898 B1* | 6/2020 | Phillips | H04L 51/02 |
| 2007/0174774 A1 | 7/2007 | Lerman et al. | |
| 2010/0042642 A1* | 2/2010 | Shahraray | G06F 16/955 |
| | | | 707/756 |
| 2010/0310232 A1 | 12/2010 | Iwase et al. | |
| 2010/0322310 A1* | 12/2010 | Deng | H04N 19/142 |
| | | | 375/240.12 |
| 2012/0081530 A1* | 4/2012 | Kerr | H04N 5/222 |
| | | | 348/61 |
| 2013/0050233 A1* | 2/2013 | Hirsch | G09G 5/00 |
| | | | 345/589 |
| 2014/0112534 A1* | 4/2014 | Sako | G06F 21/6245 |
| | | | 382/103 |
| 2014/0376887 A1 | 12/2014 | Tijssen et al. | |
| 2016/0351231 A1* | 12/2016 | Woods | G11B 27/28 |
| 2017/0048477 A1* | 2/2017 | Hasegawa | G11B 27/034 |

FOREIGN PATENT DOCUMENTS

| | | |
|---|---|---|
| CN | 103826168 A | 5/2014 |
| CN | 104581380 A | 4/2015 |
| CN | 104811787 A | 7/2015 |
| CN | 104853081 A | 8/2015 |
| CN | 105493512 A | 4/2016 |
| CN | 105657538 A | 6/2016 |
| CN | 105812865 A | 7/2016 |
| CN | 105979267 A | 9/2016 |
| CN | 106412645 A | 2/2017 |
| CN | 106899802 A | 6/2017 |
| CN | 107018443 A | 8/2017 |
| CN | 107613235 A | 1/2018 |

* cited by examiner

VIDEO RECORDING METHOD AND DEVICE

The present application is a US National Stage of International Application No. PCT/CN2018/107299, filed on Sep. 25, 2018, which claims the priority of Chinese patent application No. 201710876316.0, filed with Chinese Patent Office on Sep. 25, 2017, and entitled "Video Recording Method and Device", the contents of which are incorporated by reference herein in its entirety.

FIELD

The present application relates to the technical field of video recording, in particular to a video recording method and device.

BACKGROUND

At present, a mobile terminal (for example, a mobile phone) is generally provided with a video recording function. When a user uses a mobile terminal to record videos, if the recording time is too long, then the user easily feels tired. Under this condition, the user may relieve fatigue through switching hands to operate, and may click by mistake various buttons or controls due to fatigue, thereby leading to jitter and mistake or other problems of the recorded videos.

In order that the recorded video presents a better audio-visual experience, the user needs to perform post processing on the recorded video, to remove such problems as jitter and mistake. While for the videos which are recorded for a long time, since many problems such as jitter and mistake exist in the video, the costs of later editing are high.

SUMMARY

The present application provides a video recording method and device, to solve the problem of high costs of later editing existing in the video recording solution in the prior art.

To solve the above problem, according to a first aspect of the present application, the present application discloses a video recording method, including:

receiving, by an application of a mobile terminal, a video recording instruction of a user;

generating a video stream that can be edited according to segments based on a photographing scene, where the video stream includes at least one frame sequence segment;

and uploading the edited video stream to a server.

According to a second aspect of the present application, the present application further discloses a video recording device, including:

a receiving module, configured to receive a video recording instruction of a user;

a generating module, configured to generate a video stream that can be edited according to segments based on a photographing scene, where the video stream includes at least one frame sequence segment; and an uploading module, configured to upload the edited video stream to a server.

According to a third aspect of the present application, the present application further discloses a mobile terminal, including:

a storage, a processor, and video recording programs stored on the storage and capable of running on the processor, where the video recording programs are executed by the processor to realize the steps of the above video recording method.

According to a fourth aspect of the present application, the present application further discloses a computer readable storage medium, where the computer readable storage medium is stored with video recording programs thereon, and the video recording programs are executed by a processor to realize the steps of the above video recording method.

According to a fifth aspect of the present application, the present application further discloses an executable program code, where the executable program code is configured to be executed to perform the steps of the above video recording method.

Compared with the prior art, the present application has the following advantages:

in the present application, when the video is recorded, a video stream which is constituted by at least one frame sequence segment is generated, moreover, the generated video stream can be edited according to segments, that is, a longer video stream is divided into shorter frame sequence segments, and the frame sequence segments are recorded for a short time, therefore, fewer such problems as jitter and mistake occur, thereby lowering costs of later video editing.

BRIEF DESCRIPTION OF DRAWINGS

The drawings herein are incorporated into the description and constitute a part of the present description. The drawings show embodiments complying with the present application, and are used for explaining principles of the present application together with the description.

DETAILED DESCRIPTION OF THE EMBODIMENTS

Exemplary embodiments will be described in detail herein, and the examples are represented in accompanying drawings. When the following description involves accompanying drawings, unless otherwise indicated, the same number in different accompanying drawings represents the same or similar element. The implementation modes described in the following exemplary embodiments do not represent all the implementation modes consistent with the present application. In contrary, such implementation modes are merely examples of devices and methods consistent with some aspects of the present application as detailed in the attached claims.

Figure 1:
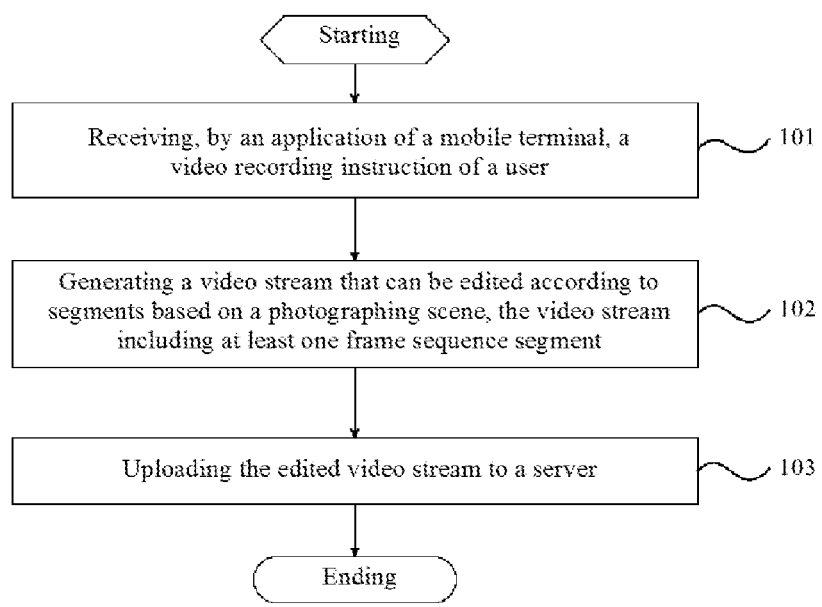
FIG. 1 is a flow chart of steps of an embodiment of a video recording method according to the present application.

When a user uses a mobile terminal to record videos, if the recording time is too long, such problems as jitter and mistake exist in a recorded video. Under this condition, the user has a requirement of continuously capturing after stopping capturing for a period of time. Herein, the videos can be captured in multiple segments by utilizing the technical solution provided in embodiments of the present application, thereby satisfying the requirement of a user on capturing videos in multiple segments. An executive body of the present solution can be a mobile terminal, for example, a mobile phone, or, the executive body of the present solution can also be an application in the mobile terminal, for example, video recording software, which is not defined specifically. Refer to FIG. 1 which shows a flow chart of steps of an embodiment of a video recording method according to the present application, and the following steps can be included specifically:

step 101, receiving a video recording instruction of a user;

In one condition, an application of a mobile terminal receives a video recording instruction of a user. Where, the application can be video recording software, and is mounted on a mobile terminal (for example, a mobile phone).

Figure 2:
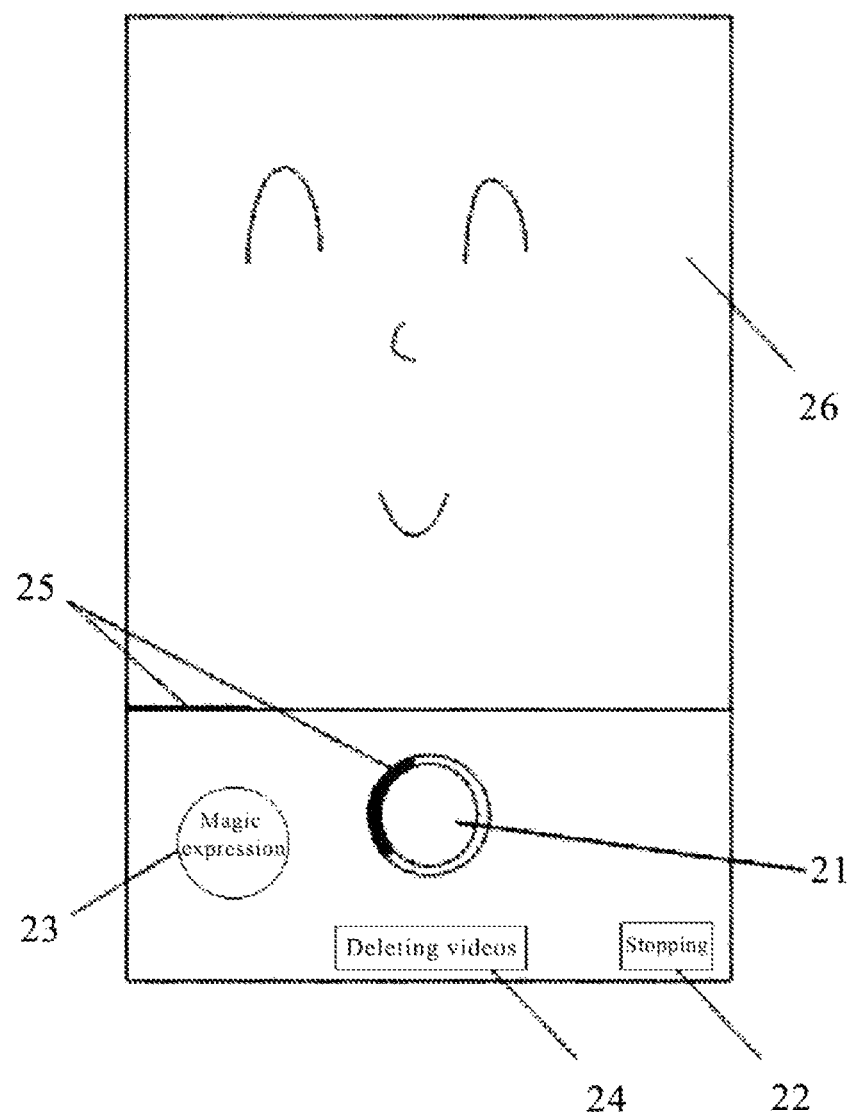
FIG. 2 is a schematic diagram of a video recording interface according to the present application.

In an optional embodiment, after a user opens video recording software, a mobile terminal displays the video recording interface as shown in FIG. 2, and when the user clicks the video recording button 21, the video recording software in an embodiment of the present application can receive a video recording instruction triggered by the user.

step 102, generating a video stream that can be edited according to segments through capturing a photographing scene, where the video stream includes at least one frame sequence segment;

where, in one optional embodiment, after the video recording software in the embodiment of the present application receives the video recording instruction triggered by a user, videos can be captured for the photographing scene by utilizing an acquisition device (for example, a camera) of the mobile terminal, to obtain a video stream.

It should be noted that, in a method of an embodiment of the present application, when a video is recorded for a photographing scene, segmented video streams are generated, and "segmented" herein means that a video stream is divided into multiple frame sequence segments; where the video stream includes at least one frame sequence segment (for example, a YUV frame sequence segment), each of the frame sequence segments can be edited singly, such that the video stream can be edited according to segments, that is, the frame sequence segments are edited one by one.

For example, video streams that can be edited according to segments can be generated according to time factors. Specifically speaking, in a capturing process, a frame sequence segment can be generated per preset time period according to multiple video frames captured within the time period, for example, per 30 seconds, and multiple video frames captured within the 30 seconds constitute a frame sequence segment.

For another example, video streams that can be edited according to segments can be generated according to scene factors. Specifically speaking, in a capturing process, whether a photographing scene is changed is detected; if the photographing scene is changed, then a frame sequence segment is generated according to multiple video frames captured before change of the photographing scene, and another frame sequence segment is generated according to multiple video frames captured after change of the photographing scene. For example, multiple video frames are captured firstly for a scene A, and then for a scene B. After switching of a photographing scene is detected, multiple video frames captured for the scene A constitute a frame sequence segment, and multiple video frames captured for the scene B constitute another frame sequence segment.

Where the video stream generated in step 102 can be temporarily stored in a memory of a mobile terminal. After step 102, the generated video streams are edited according to segments.

Step 103, uploading the edited video stream to a server.

Where, the video streams in the memory can be edited according to segments, the video streams that have been edited according to segments are input into an encoder (any one video encoder in the prior art) for encoding, and then the encoded video streams are compressed. Since the space occupied by the video data is large, therefore, the video streams after editing and compression can be uploaded to a server from a memory, to save a storage space of the mobile terminal.

In some conditions, the video streams that are edited according to segments can also be encoded video streams. In this condition, the video streams do not need to be encoded and compressed.

By means of the technical solution provided in the above embodiment of the present application, when the video is recorded, a video stream which is constituted by at least one frame sequence segment is generated, and the generated video stream can be edited according to segments, that is, a longer video stream is divided into shorter frame sequence segments, and the frame sequence segments are recorded for a short time, therefore, fewer such problems as jitter and mistake occur, thereby lowering costs of later video editing.

In a possible implementation mode, step 102 can be realized through the following sub steps:

S11, recording a first position of a first video frame captured for the photographing scene in the video stream;

In an optional embodiment, after an application of a mobile terminal receives a video recording instruction of a user, videos can be captured for the photographing scene by utilizing an acquisition device (for example, a camera) of the mobile terminal, then the video frame captured is just the first video frame herein when the video recording instruction is received. In an embodiment of the present application, the position of the first video frame in the video streams obtained through capturing can be recorded, that is, the first position herein. The first video frame can be recorded as an initial frame of a captured frame sequence segment.

In addition, in an optional embodiment, when a user firstly clicks a video recording button 21 as shown in FIG. 2 to trigger a video recording instruction, through the method of an embodiment of the present application, not only videos can be recorded, but also the color of the video recording button 21 can be set to red, to prompt a user that the current mobile terminal is in a video recording state.

S12, receiving a pause recording instruction of the user;

For example, an application of a mobile terminal can receive the pause recording instruction of the user.

In an optional embodiment, a user can click the video recording button 21 to start a video recording process. In the process, if the user wants to pause the recording of the captured video due to various reasons, the user can click again the video recording button 21 to trigger the pause recording instruction of the recorded video.

In one condition, the video recording button 21 can be red, and when the user clicks again the video recording button 21, the color of the video recording button 21 can be changed to yellow from red, to prompt the user of a pause of current video recording.

S13, recording a second position of a second video frame captured for the photographing scene in the video stream according to the pause recording instruction;

In one condition, the video frame captured can be taken as a second video frame after the pause recording instruction is received, and the second position of the second video frame in the video stream is recorded. In another condition, when the pause recording instruction of the user is received, the position of the current frame received at this time (that is, the time when a video pause recording instruction of the user is received) in the received frame sequence is recorded and taken as the second position, and the current frame (the second video frame) can be taken as an end frame of a segment of captured video (a frame sequence segment).

In an optional embodiment, for the video frame (that is, the second video frame herein) captured when the pause recording instruction is received, in an embodiment of the present application, the position (that is, the second position herein) of the second video frame in the video stream obtained through capturing can be recorded. The second video frame can be recorded as an end frame of a captured frame sequence segment.

It should be noted that, when an application of a mobile terminal receives a pause recording instruction of a user, an acquisition device (for example, a camera) of the mobile terminal will continuously find a view for the video at the photographing scene, such that the user can also preview the view finding pictures from the video recording interface. However, the video frames (constituted frame sequences) obtained through view finding will not be recorded and stored after the pause recording instruction of the user is received and before the video recording instruction is received again.

S14, generating a frame sequence segment according to the first position and the second position.

Where, after the second position is recorded, that is, after a video segment is captured, the frame sequences between the first position and the second position obtained through capturing will generate a frame sequence segment. Where, the frame sequence segment includes an initial frame located at the first position and the end frame located at the second position.

Where, after the above substeps S11-S14 are performed, the first frame sequence segment is generated, that is, the capturing of the first video segment is finished. If the user wants to continuously capture the next video segment, the user can click again the video recording button 21 which is changed to yellow, so as to trigger the video recording instruction to perform step 101; then the user continuously performs substeps S11-S14 of step 102, to capture the first video segment to obtain the second frame sequence segment.

In a possible implementation mode, step 102 can be realized through the following sub steps:

S15, adding a preset magic expression to each frame of data captured for the photographing scene;

Where, after a video recording instruction of a user is received, for each frame of data obtained through capturing, in the method of the embodiment of the present application, a preset magic expression will be added.

Where, the user can select from multiple candidate magic expressions before video recording to obtain a preset magic expression.

S16, generating the video stream that can be edited according to segments according to the each frame of data added with the preset magic expression.

If a video stream that can be edited according to segments can be generated by utilizing the present implementation mode, then each frame of data in each frame sequence segment in the video stream is added with the preset magic expression.

In a possible implementation mode, when step 102 is performed, in an embodiment of the present application, each frame of data can not only be added with the magic expression, but also can be added with watermarks, and/or can be beautified.

Where, specific manners of adding watermarks and beautifying are similar to the steps of adding a preset magic expression described in the above embodiments, and will not be repeated redundantly herein. Similarly, as to added watermarks and beautifying treatment, a user can select before video recording, to preset watermarks and beautifying treatment, for example, adding watermarks of dates and beautifying with a whitening mode.

In addition, in one specific embodiment, as shown in FIG. 2, the video recording interface can also provide an entry point to add magic expressions, that is, a magic expression button 23. In the pause recording process of a video, a user can click the magic expression button 23 in the video recording interface as shown in FIG. 2, to pop up multiple magic expressions on the video recording interface, and the user can select a favorite target magic expression from the popped-up magic expressions.

Where, if a user switches the magic expression in a video pause recording process, for example, the user switches a preset magic expression to the target magic expression, then the user can add the target magic expression to each frame of data in the to-be-recorded next video segment (that is, the next frame sequence segment).

Herein, pretreatment operation of the present application is described with the magic expression as an example, and the switching manners aiming at other pretreatment operations such as adding watermarks and beautifying are similar to the switching flow of magic expressions, and will not be repeated redundantly herein.

By means of the technical solution of the embodiment of the present application, in the present application, not only the videos can be captured in multiple segments, but also the videos captured in multiple segments are added with magic expressions and watermarks and are beautified, such that the recorded videos have been beautified, thereby saving costs and time of video post-processing.

In a possible implementation mode, when step 103 is performed, the method of the embodiment of the present application can be realized through the following manners:

receiving a video delete instruction of the user;

determining a most recently generated target frame sequence segment in a currently generated video stream according to the video delete instruction;

deleting the target frame sequence segment in the video stream, to obtain a target video stream; and uploading the target video stream to the server.

For example, an application of a mobile terminal can receive the video delete instruction of the user.

Specifically speaking, refer to FIG. 2, since in the video recording method of the embodiment of the present application, a solution of recording and storing according to segments is adopted, therefore, when the user wants to delete a video segment that he doesn't like or that has flaws, the user can click a video delete button 24 on the video capturing interface as shown in FIG. 2, to trigger the video delete instruction of the user, then the application of the method in the embodiment of the present application can receive the video delete instruction of the user. Where, the user can click the video delete button 24 to trigger the video delete instruction both in a video capturing process, that is, in a state when the video recording button 21 is red, and in a video pause capturing process, that is, in a state when the video recording button 21 is yellow. Afterwards, in the method of the embodiment of the present application, a most recently generated frame sequence segment (that is, the target frame sequence segment) in the currently generated video stream can be determined according to the video delete instruction. Where, the so-called currently generated video stream is the video stream generated in step 102, that is, the video stream that has been obtained through capturing. The video stream may contain multiple frame sequence segments generated after triggering the video recording instruction and the pause capturing instruction for multiple times. Herein, the most recently generated frame sequence segment (that is, the target frame sequence segment) in the video stream generated in the capturing recently should be determined, and the target frame sequence segment is deleted from the video stream, to obtain the target video stream. Finally, the target video stream is uploaded to the server.

The currently generated video stream does not represent that the video stream has been finished, the currently generated video stream represents the video stream that is processed currently, and the video stream is also possibly added with a new frame sequence segment. The target frame sequence segment represents the newly generated frame sequence segment at the current moment, or in other conditions, the currently generated video stream can also refer to the video stream that has been recorded, and this is not limited specifically.

Herein, the video delete instruction can contain identification information of a video stream to which the frame sequence segments currently captured for multiple segments belong, for example, a video stream 1 includes a frame sequence segment 1 and a frame sequence segment 2. The frame sequence segment in which video stream should be deleted can be determined according to the video delete instruction. The video stream herein is the video stream 1 (the identification of a video stream), then the most recently generated frame sequence segment (that is, the target frame sequence segment) is found in multiple frame sequence segments of the video stream 1 cached in the memory. Since each frame sequence segment records a first position of the initial frame and a second position of the end frame, the target frame sequence segment in the video stream 1 can be determined according to a group of first positions and second positions lastly recorded; and the target frame sequence segment is deleted from the video stream 1 cached in the memory.

In this way, in the present implementation mode, through determining the most recently generated target frame sequence segment in the currently generated video stream, the frame sequence segments which are captured and cached in multiple segments are deleted according to segments in the video capturing process or video pause capturing process or when the video capturing is finished; moreover, when the frame sequence segment is deleted, the frame sequence segment recorded later is deleted firstly, that is, a principle of lastly deleting those which are recorded firstly is followed, such that the user can immediately delete the unsatisfactory video segments recorded currently not only in the video recording process but also in the video pause recording process, thereby further reducing later editing costs.

Where, in a possible implementation mode, the step of uploading the target video stream to the server includes: synthesizing the frame sequence segments contained in the target video stream; and uploading the synthesized target video stream to the server.

Where, in a possible embodiment, after multiple segments of videos are captured, if the user does not need to capture multiple segments of videos and wants to directly stop capturing, he can click a stop button 22 as shown in FIG. 2, to trigger the stop capturing instruction. When the stop capturing instruction of the user is received, at least two frame sequence segments which are cached in the memory and which are remaining after the above delete edits (that is, the edit operation of deleting the lastly generated frame sequence segment in the above embodiment) are synthesized into a target video stream. Where, the so-called synthesis means to connect in sequence the initial frame and end frame of at least two frame sequence segments to form a complete frame sequence, that is, a target video stream.

For example, in a segmented recording of a video, a frame sequence segment 1 including an initial frame 1 and an end frame 1 is recorded in the first segment; and a frame sequence segment 2 including an initial frame 2 and an end frame 2 is recorded in the second segment. When at least two frame sequence segments which are cached in the memory are synthesized into a target video stream, the end frame 1 and the initial frame 2 can be connected, such that the two frame sequence segments are synthesized into a target frame sequence.

Where, the number of frame sequence segments is the same as the times of segmented capturing in one video recording process of the user.

In this way, in the present embodiment, not only segmented editing and storage of the video can be realized, the frame sequence segments which are edited according to segments and stored can also be synthesized into a complete video stream and uploaded to the server for storage, so as to facilitate sharing of the video stream.

In a possible implementation mode, as shown in FIG. 2, when the video is recorded, a video recording progress bar 25 is displayed below the previewed video content 26, and/or, in another possible implementation mode, the video recording progress bar 25 can also be displayed on the circumference of the video recording button 21.

In this way, in an embodiment of the present application, through setting a display manner of the above video recording progress bar, the video recording progress can be more intuitive.

It should be noted that, for a method embodiment, to simplify description, the method embodiment is illustrated as a series of action combinations, however, those skilled in the art should be enlightened that, an embodiment of the present application is not limited by the described action sequences, since based on an embodiment of the present application, some steps can adopt other sequences or can be performed simultaneously. Secondly, those skilled in the art should also be enlightened that, embodiments described in the description are all preferred embodiments, and the involved actions are not necessarily essential for embodiments of the present application.

Figure 3:
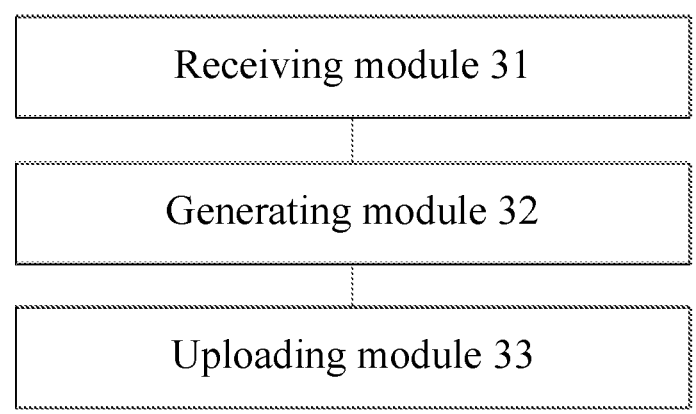
FIG. 3 is a structural diagram of an embodiment of a video recording device according to the present application.

Corresponding to the method provided in the above embodiment of the present application, refer to FIG. 3 which shows a structural diagram of an embodiment of a video recording device according to the present application. Specifically, the following modules are included:

a receiving module 31, configured to receive a video recording instruction of a user;

a generating module 32, configured to generate a video stream that can be edited according to segments through capturing a photographing scene, where the video stream includes at least one frame sequence segment; and an editing module (not shown in the figure), configured to edit the video stream according to the segments.

In a possible implementation mode, the device further includes: an uploading module 33 configured to upload the edited video stream to a server.

In a possible implementation mode, the generating module 32 includes:

a first recording submodule, configured to record a first position of a first video frame captured for the photographing scene in the video stream;

a first receiving submodule, configured to receive a pause recording instruction of the user;

a second recording submodule, configured to record a second position of a second video frame captured for the photographing scene in the video stream; and a first generating submodule, configured to generate a frame sequence segment according to the first position and the second position.

In a possible implementation mode, the generating module 32 includes:

an adding submodule, configured to add a preset magic expression to each frame of data captured for the photographing scene; and a second generating submodule, configured to generate the video stream that can be edited according to segments according to the each frame of data added with the preset magic expression.

In a possible implementation mode, the uploading module 33 includes:

a second receiving submodule, configured to receive a video delete instruction of the user;

a determining submodule, configured to determine a most recently generated target frame sequence segment in a currently generated video stream according to the video delete instruction;

a deleting submodule, configured to delete the target frame sequence segment in the video stream, to obtain a target video stream; and an uploading submodule, configured to upload the target video stream to the server.

In a possible implementation mode, the uploading submodule includes:

a synthesis unit, configured to synthesize frame sequence segments contained in the target video stream; and an uploading unit, configured to upload the synthesized target video stream to the server.

Since a device embodiment is basically similar to a method embodiment, so the description of the device embodiment is simple, and for related parts, please refer to part of the description of the method embodiment.

According to another embodiment of the present application, the present application further discloses a mobile terminal, and the mobile terminal includes:

a storage, a processor, and video recording programs stored on the storage and capable of running on the processor, where the video recording programs are executed by the processor to realize the steps of the above video recording method.

According to another embodiment of the present application, the present application further discloses a computer readable storage medium, where the computer readable storage medium is stored with video recording programs thereon, and the video recording programs are executed by a processor to realize the steps of the above video recording method.

According to another embodiment of the present application, the present application further discloses an executable program code, where the executable program code is configured to be executed to perform the steps of the above video recording method.

Each embodiment in the present description is described in a progressive manner. Each embodiment highlights the differences with other embodiments, and the same and similar parts among each embodiment can be referred to mutually.

Those skilled in the art should understand that, examples of the embodiments of the present application may be embodied as a method, a device or a computer program product (such as an executable program code). Accordingly, an embodiment of the present application may take the form of an entirely hardware embodiment, an entirely software embodiment, or an embodiment combining software and hardware aspects. Moreover, an embodiment of the present application can take the form of a computer program product which is executed on one or more computer-usable storage medium (including but not limited to a magnetic disk storage, a CD-ROM optical memory) containing computer-usable program code.

An embodiment of the present application is described with reference to flowcharts and/or block diagrams of methods, terminal devices (systems) and computer program products according to embodiments of the present application. It should be understood that, each flow and/or block of the flowcharts and/or block diagrams, and combinations of flowcharts and/or blocks in the flowcharts and/or block diagrams can be implemented by computer program instructions. These computer program instructions may be provided to a processor of a general purpose computer, a special purpose computer, an embedded processor or other programmable data processing terminal device to produce a machine, such that instructions, which are executed via the processor of the computer or other programmable data processing terminal device, create means for implementing the functions specified in one or more flows in the flowchart and/or one or more blocks in the block diagram.

These computer program instructions may also be stored in a computer readable memory that can direct a computer or other programmable data processing terminal device to function in a particular manner, such that the instructions stored in the computer readable memory produce an article of manufacture including instruction means which implement the functions specified in one or more flows in the flowchart and/or one or more blocks in the block diagram.

These computer program instructions may also be loaded onto a computer or other programmable data processing terminal device, to cause a series of operational steps to be performed on the computer or other programmable terminal device to produce treatment implemented by a computer, such that the instructions which are executed on the computer or other programmable terminal device provide steps for implementing the functions specified in one or more flows in the flowchart and/or one or more blocks in the block diagram.

Although preferred embodiments of embodiments of the present application have been described, once those skilled in the art know basic creative concepts in the art, they can make additional alterations and modifications to these embodiments. Therefore, the appended claims are construed to include preferred embodiments and all the alterations and modifications falling within the scope of embodiments of the present application.

Finally, it should also be noted that, in the text, relational terms such as first and second are only used to distinguish one entity or operation from another entity or operation, and do not necessarily require or imply any such actual relationship or sequence between these entities or operations. Moreover, the term "include", "including" or any of its other variants is intended to cover a non-exclusive inclusion, such that the process, method, article or terminal device including a series of elements not only includes those elements, but also includes other elements which are not definitely listed, or also includes the elements inherent to such process, method, article or terminal device. In the absence of more restrictions, the element defined by a sentence "including a ..." does not exclude the existence of another same element in the process, method, article or terminal device including the element.

A detailed introduction is given above on a video recording method and a video recording device provided by the present application. In the text, specific examples are utilized to illustrate principles and implementation modes of the present application, and description of the above embodiments is merely used for helping to understand methods and core concepts of the present application. Meanwhile, for those skilled in the art, based on the concept of the present application, changes may be made to specific implementation modes and application scopes. In summary, the contents of the present description should not be understood as a limitation to the present application.

What is claimed is:

1. A video recording method, applied during capturing a photographing scene, and comprising:
   receiving a video recording instruction of a user;
   generating segments of a video stream that can be edited according to the segments through capturing the photographing scene, wherein the segments of the video stream comprises a first segment and a second segment which are stored independently, the first segment is generated in response to the user triggering the video recording instruction for a first time and then triggering a pause recording instruction for a first time, and the second segment is generated in response to the user triggering the video recording instruction for a second time and then triggering the pause recording instruction for a second time;
   displaying a video recording progress bar in response to capturing the photographing scene; and
   generating the video stream by connecting an end frame of the first segment and an initial frame of the second segment in sequence to form a complete frame sequence in response to the user triggering a stop recording instruction.

2. The method of claim 1, wherein the generating the segments of the video stream that can be edited according to the segments through capturing the photographing scene comprises:
   recording a first position of a first video frame captured for the photographing scene in the video stream;
   receiving the pause recording instruction of the user;
   recording a second position of a second video frame captured for the photographing scene in the video stream; and
   generating a frame sequence segment according to the first position and the second position.

3. The method according to claim 1, wherein the generating the segments of the video stream that can be edited according to the segments through capturing the photographing scene comprises:
   adding a preset magic expression to each frame of data captured for the photographing scene; and
   generating the segments of the video stream that can be edited according to the segments according to the each frame of data added with the preset magic expression.

4. The method according to claim 1, further comprising:
   uploading the video stream, that is edited according to the segments, to a server.

5. The method according to claim 4, wherein the uploading the video stream, that is edited according to the segments, to the server comprises:
   receiving a video delete instruction of the user;
   determining a most recently generated target frame sequence segment in a currently generated video stream according to the video delete instruction;
   deleting the target frame sequence segment in the currently generated video stream, to obtain a target video stream; and
   uploading the target video stream to the server.

6. The method according to claim 5, wherein the uploading the target video stream to the server comprises:
   synthesizing frame sequence segments contained in the target video stream; and
   uploading the synthesized target video stream to the server.

7. The method of claim 1, wherein a quantity of the segments of the video stream is equal to times of triggering the video recording instruction or times of triggering the pause recording instruction.

8. The method of claim 1, wherein the video recording progress bar is displayed on a circumference of a video recording button.

9. A video recording device, applied during capturing a photographing scene, and comprising:
   a processor configured to read and execute program in a memory to:
   receive a video recording instruction of a user;
   generate segments of a video stream that can be edited according to the segments through capturing the photographing scene, wherein the segments of the video stream comprises a first segment and a second segment which are stored independently, the first segment is generated in response to the user triggering the video recording instruction for a first time and then triggering a pause recording instruction for a first time, and the second segment is generated in response to the user triggering the video recording instruction for a second time and then triggering the pause recording instruction for a second time;
   display a video recording progress bar in response to capturing the photographing scene; and
   generating the video stream by connecting an end frame of the first segment and an initial frame of the second segment in sequence to form a complete frame sequence in response to the user triggering a stop recording instruction.

10. The device according to claim 9, wherein the processor is further configured to read and execute the program to:
    record a first position of a first video frame captured for the photographing scene in the video stream;
    receive the pause recording instruction of the user;
    record a second position of a second video frame captured for the photographing scene in the video stream; and
    generate a frame sequence segment according to the first position and the second position.

11. The device according to claim 9, wherein the processor is further configured to read and execute the program to:
    add a preset magic expression to each frame of data captured for the photographing scene; and
    generate the segments of the video stream that can be edited according to the segments according to the each frame of data added with the preset magic expression.

12. The device according to claim 9, wherein the processor is further configured to read and execute the program to:
    upload the edited video stream to a server.

13. The device according to claim 12, wherein the processor is further configured to read and execute the program to: receive a video delete instruction of the user;

determine a most recently generated target frame sequence segment in a currently generated video stream according to the video delete instruction;

delete the target frame sequence segment in the currently generated video stream, to obtain a target video stream; and upload the target video stream to the server.

14. The device according to claim 13, wherein the processor is further configured to read and execute the program to:

synthesize frame sequence segments contained in the target video stream; and upload synthesized target video stream to the server.

15. The method of claim 9, wherein a quantity of the segments of the video stream is equal to times of triggering the video recording instruction or times of triggering the pause recording instruction.

16. The method of claim 9, wherein the video recording progress bar is displayed on a circumference of a video recording button.

17. A mobile terminal, comprising a storage, a processor, and video recording programs stored on the storage and capable of running on the processor, wherein the video recording programs are executed by the processor to realize of the video recording method in claim 1.

18. A non-transitory computer readable storage medium, wherein the computer readable storage medium is stored with video recording programs thereon, and the video recording programs are executed by a processor to realize the video recording method in claim 1.

19. A non-transitory computer readable storage medium storing an executable program code, wherein the executable program code is configured to be executed to perform of the method in claim 1.

* * * * *